(12) United States Patent
Arbel et al.

(10) Patent No.: US 7,562,325 B1
(45) Date of Patent: *Jul. 14, 2009

(54) DEVICE TO CLUSTER BOOLEAN FUNCTIONS FOR CLOCK GATING

(75) Inventors: Eli Arbel, Migdal Haemek (IL); Oded Fuhrmann, Zichron Yaakov (IL); Cynthia Rae Eisner, Zichron Yaacov (IL); Alexander Itskovich, Yoqneam Ilit (IL); David J. Levitt, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/236,543

(22) Filed: Sep. 24, 2008

Related U.S. Application Data

(63) Continuation of application No. 12/053,384, filed on Mar. 21, 2008, now Pat. No. 7,458,050.

(51) Int. Cl.
*G06F 17/50* (2006.01)
(52) U.S. Cl. ............................................. 716/7; 716/2
(58) Field of Classification Search .................... 716/2, 716/7
See application file for complete search history.

(56) References Cited

U.S. PATENT DOCUMENTS

| 4,607,339 | A | * | 8/1986 | Davis ........................... 716/10 |
| 6,006,023 | A | * | 12/1999 | Higashida ...................... 716/6 |
| 6,434,704 | B1 | * | 8/2002 | Dean et al. .................... 713/320 |
| 6,440,780 | B1 | * | 8/2002 | Kimura et al. ................ 438/129 |
| 6,536,024 | B1 | * | 3/2003 | Hathaway ........................ 716/6 |
| 6,609,228 | B1 | | 8/2003 | Bergeron et al. |
| 6,704,916 | B1 | * | 3/2004 | Nishida et al. ................ 716/10 |
| 6,735,558 | B1 | * | 5/2004 | Yamaguchi ................... 703/14 |
| 7,225,421 | B2 | | 5/2007 | Migatz et al. |
| 7,458,050 | B1 | * | 11/2008 | Arbel et al. ..................... 716/7 |
| 2002/0049958 | A1 | * | 4/2002 | Shimazawa ................... 716/18 |
| 2007/0157130 | A1 | | 7/2007 | Eisner et al. |
| 2008/0195367 | A1 | * | 8/2008 | Higuchi ......................... 703/16 |
| 2008/0301594 | A1 | * | 12/2008 | Jiang et al. ..................... 716/2 |

OTHER PUBLICATIONS

Ding, et al. "Cluster Merging and Splitting in Hierarchial Clustering Algorithms", Proceedings of 2002 IEEE International Conference on Data Mining, 2002, pp. 139-146.

* cited by examiner

*Primary Examiner*—Phallaka Kik
(74) *Attorney, Agent, or Firm*—Doster Greene, LLC

(57) ABSTRACT

A system for clustering Boolean functions for clock gating according to various exemplary embodiments can include a computer configured to identify at least two small gating groups within a clock tree representative of an electrical network and at least two gating functions of the at least two small gating groups, wherein the at least two gating functions are Boolean functions; perform hierarchical clustering on the at least two gating functions using a similarity measure that describes a distance between the at least two gating functions such that the clustering forms a merge function of a cluster generated and displayed in a form of a dendrogram; assign to each gating domain a merit value according to a power consumption profile of the gating domain using a merit function; and partition the cluster into gating groups using the dendrogram to construct a directed acyclic graph to determine a partition which maximize the overall power saving.

1 Claim, 6 Drawing Sheets

FIG. 4A

|  $u_1$  |  $u_2$  |  $u_3$  | $f_1$ $\bar{u}_1\bar{u}_2\bar{u}_3$ | $g_1$ $\bar{u}_1\bar{u}_2 u_3$ |
|---|---|---|---|---|
| 0 | 0 | 0 | 1 | 0 |
| 0 | 0 | 1 | 0 | 1 |
| 0 | 1 | 0 | 0 | 0 |
| 0 | 1 | 1 | 0 | 0 |
| 1 | 0 | 0 | 0 | 0 |
| 1 | 0 | 1 | 0 | 0 |
| 1 | 1 | 0 | 0 | 0 |
| 1 | 1 | 1 | 0 | 0 |

$$1 - \frac{0+0}{2} = 1$$

FIG. 4B

|  $u_1$  |  $u_2$  |  $u_3$  | $f_2$ $u_1+u_2$ | $g_2$ $u_2+u_3$ |
|---|---|---|---|---|
| 0 | 0 | 0 | 0 | 0 |
| 0 | 0 | 1 | 0 | 1 |
| 0 | 1 | 0 | 1 | 1 |
| 0 | 1 | 1 | 1 | 1 |
| 1 | 0 | 0 | 1 | 0 |
| 1 | 0 | 1 | 1 | 1 |
| 1 | 1 | 0 | 1 | 1 |
| 1 | 1 | 1 | 1 | 1 |

$$1 - \frac{5+1}{14} \approx 0.57$$

Example for K=2: Node (IN$_7$) as new gating domain and continue with f$_4$, f$_5$ and f$_6$

DEVICE TO CLUSTER BOOLEAN FUNCTIONS FOR CLOCK GATING

RELATED APPLICATION

This is a continuation application to U.S. patent application Ser. No. 12/053,384, entitled "Method To Cluster Boolean Functions For Clock Gating," filed Mar. 21, 2008, now U.S. Pat. No. 7,458,050, the contents of which is incorporated herein by reference.

FIELD

The present teachings relate to devices and methods for partitioning a set of clock gating functions into gating groups of admissible sizes, while maximizing the overall power saving obtained by the partition.

INTRODUCTION

In circuit design, the construction of Very Large Scale Integrated (VLSI) circuit chips recently have become increasing more complex oftentimes including millions of elements. Consequently, one important issue for circuit designers during the design process is the placement of the elements in the chip to ensure efficient operation of the circuit and to reduce the circuit's power consumption.

One technique for reducing power consumption in circuit designs is to reduce the power of a circuit's clock distribution tree by breaking up the clock into several separate clocks that can be individually controlled or disabled when some portions of the circuit do not need to be clocked. This process, known as "clock gating", disables the clocks fed to logic blocks of the circuit when the logic blocks do not change state, or are not currently in use by the circuit. Power consumption due to the clocking of logic blocks that are not directly involved with the current operation of the circuit thereby is minimized. In other words, this means if the clock input is halted while there is no change in the circuit, it helps to reduce the power consumption.

However, one problem associated with clock gating is that clock gating adds gates to the circuit, and these extra gates add both area and power. If a designer is not careful, the extra clock gating hardware can consume more power than is saved. In order to have a net power savings, the clock gating logic must consume less power than is saved by gating the clocks off.

Clock gating of a flip-flop or latch may be performed by using a gating function which can be calculated in various ways. Since the gating function itself wastes power and requires an additional LCB (Local Clock Buffer) which wastes power as well, it may be desirable to gate a number of flip-flop or latches as "a gating group", using the same gating function and LCB to increase the amount of power saving. In cases where there are two or more gating functions and their gating groups are too small, these groups may be merged and gated using a new gating function which is an approximation of the original gating functions.

Given a set of gating functions, as shown, for example in FIG. 1, the problem is to find a process to group several small gating domains into larger gating domains and to determine how to partition the grouped gating domains to form the larger gating domains such that power saving is maximized.

Several techniques have been proposed for inserting clock-gating circuitry into a circuit to partition the circuit's clocks. For example, this problem was previously addressed in a paper called "Power Reduction Through Clock Gating by Symbolic Manipulation" by Frans Theeuwen and Erid Seelen. The authors of this paper suggested an algorithm that, given a set of gating functions, performs clustering as follows:

1. Selects the best function for gating as the current group.
2. Selects a function which if merged with the current group yields the best new group, and the merit of the new group is not less than the merit of the original groups.
3. While there exists such a function, repeat step 2.
4. If the size of the currently obtained group exceeds a predetermined threshold, implement the group, and remove all its members from further consideration. Else, remove the first function selected in step 1 from further consideration.
5. If more functions remain, return to step 1.

Unfortunately, there are several drawbacks with this approach. First, the algorithm builds only one group at a time based on the greedy choice performed in step 1. This can lead to sub-optimal choices during the group construction, because a function which increases the current group merit may contribute more to the overall power saving if added to other groups. Second, the algorithm continues to build the group only while the merit is not decreasing. This may be too greedy. It might be the case that the group's merit is decreasing, but will increase as more functions are added to the group. This is because the merit of a group also depends on the group size. Finally, the algorithm does not account for the cost of implementing the gating conditions themselves. Each gating function requires an LCB. The LCB leakage should be reflected in the group's merit calculation as it may change the final clustering results.

Furthermore, the algorithm does not account for upper limits on the group's size, which is actually a factor considered in real design methodologies, due to LCB fan-out limits. It may also be desirable that groups having sizes which are too large should be further partitioned into several smaller groups such that power saving is maximized.

SUMMARY

The present invention may satisfy one or more of the above-mentioned desirable features. Other features and/or aspects may become apparent from the description which follows.

A system for clustering Boolean functions for clock gating according to various exemplary embodiments can include a computer configured to: identify at least two small gating groups within a clock tree representative of an electrical network and at least two gating functions of the at least two small gating groups, wherein the at least two gating functions are Boolean functions; perform hierarchical clustering on the at least two gating functions using a similarity measure that describes a distance between the at least two gating functions such that the clustering forms a merge function of a cluster generated and displayed in a form of a dendrogram including a plurality of nodes, wherein each internal node of the plurality of nodes represents a respective gating domain, wherein the hierarchical clustering uses a distance function according to an equation:

$$d(f, g) \equiv 1 - \frac{|f \cdot g| + |\forall_s f \cdot g|}{2|f + g|},$$

$f$ denotes a first gating condition;
$g$ denotes a second gating condition;

where · and + are logical And Or operators, respectively, ‖ is a size of an On-set of a function;

∀s·f·g denotes a conjunction of f and g where all variables s which are not in a support of both f and g are quantified out;

2|f+g| is a normalizing term;

assign to each gating domain a merit value according to a power consumption profile of the gating domain using a merit function according to an equation:

$$M(g)=|g|\cdot Pr(f_g)-C_{LCB},$$

where $f_g$ denotes a gating function of group g;

$Pr(f_g)$ denotes a gating probability of $f_g$; and $C_{LCB}$ denotes an expression reflecting a cost of adding LCBs for gating the group;

partition the cluster into gating groups using the dendrogram to construct a directed acyclic graph and determine a longest path from a source to a sink on the directed acyclic graph in order to determine a partition which maximizes an overall power saving; and if any gating group size exceeds a predetermined local clock buffer threshold, further partition the gating group that exceeds the predetermined local buffer threshold by selecting and assigning a lowest internal node of the selected gating group which has leaves equivalent to the predetermined local clock buffer threshold as a new gating domain, and iteratively repeat on any remaining nodes of the selected gating group said hierarchical clustering to generate said dendrogram, assign, and partition.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

BRIEF DESCRIPTION OF THE DRAWINGS

The skilled artisan will understand that the drawings described below are for illustrative purposes only. The drawings are not intended to limit the scope of the present teachings in any way.

FIGS. 4A and 4B illustrate distance functions used by a clock gating tool to perform hierarchical clustering in accordance with the present teachings;

DETAILED DESCRIPTION OF VARIOUS EMBODIMENTS

Reference will now be made to various embodiments, examples of which are illustrated in the accompanying drawings. However, these various exemplary embodiments are not intended to limit the disclosure. On the contrary, the disclosure is intended to cover alternatives, modifications, and equivalents.

Throughout the application, description of various embodiments may use "comprising" language, however, it will be understood by one of skill in the art, that in some specific instances, an embodiment can alternatively be described using the language "consisting essentially of" or "consisting of."

For purposes of better understanding the present teachings and in no way limiting the scope of the teachings, it will be clear to one of skill in the art that the use of the singular includes the plural unless specifically stated otherwise. Therefore, the terms "a," "an" and "at least one" are used interchangeably in this application.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Figure 1:
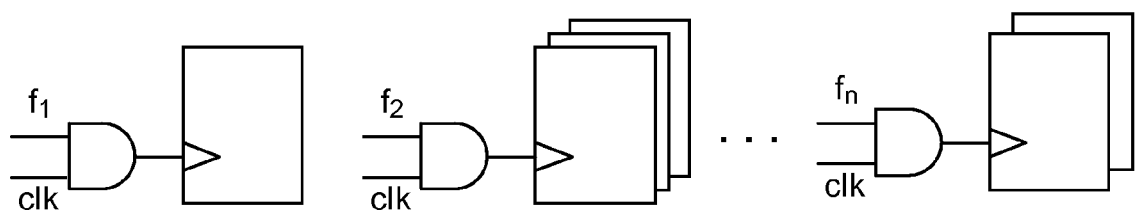
FIG. 1 illustrates gating several small gating domains into larger gating domains.
Figure 2:
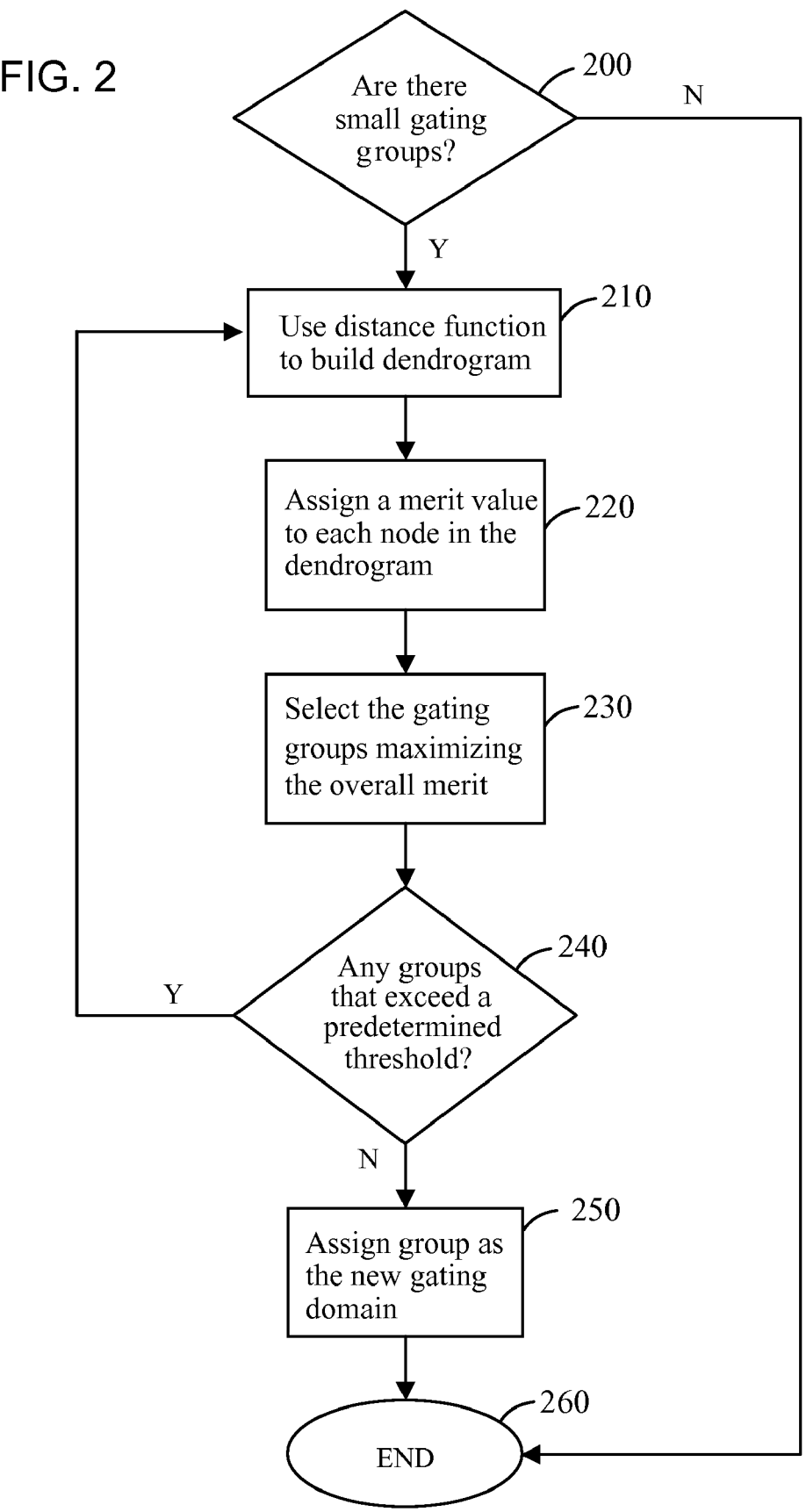
FIG. 2 is a flow chart of a clock gating tool in accordance with the present teachings.

FIG. 2 illustrates an example of execution steps used in a clock gating tool that merges small gating groups into clusters using a new gating function, which is an approximation of the original gating functions, and partitions the newly formed clusters into gating groups such that power savings is maximized, according to the present invention. The clock gating tool may be configured to design a clock signal supply network (e.g., a clock tree) for a circuit layout. The clock tree generation is intended to create an electrical network to distribute a clock signal to clocked elements for use as a sequencing control for logical operations within a chip. The clock gating tool may be computer-based, and the steps may be executed on and/or by a computer. Specifically, the clock gating tool may provide a device and method for clustering clock gating conditions using hierarchical clustering based on a similarity measure defined based upon Boolean functions.

FIG. 2 illustrates the steps of the basic algorithm of the invention. The process begins in step 200 by determining an appropriate placement region for clock gating. This is accomplished by initially determining whether the circuit includes two or more gating functions wherein their gating groups are too small. For example, an automatic tool for clock gating may derive a clock gating function for each flip-flop of latch in the design. The gating functions may be, for example, Boolean functions. Furthermore, design methodology may impose a lower limit on the number of flip-flop or latches that can be driven by a single LCB. In this case, gating functions that control gating groups of size below the methodology limit are considered too small, and should be clustered.

If there are no small gating groups in the circuit suitable for clustering, the method proceeds to step 260 and ends the process.

Figure 3A:
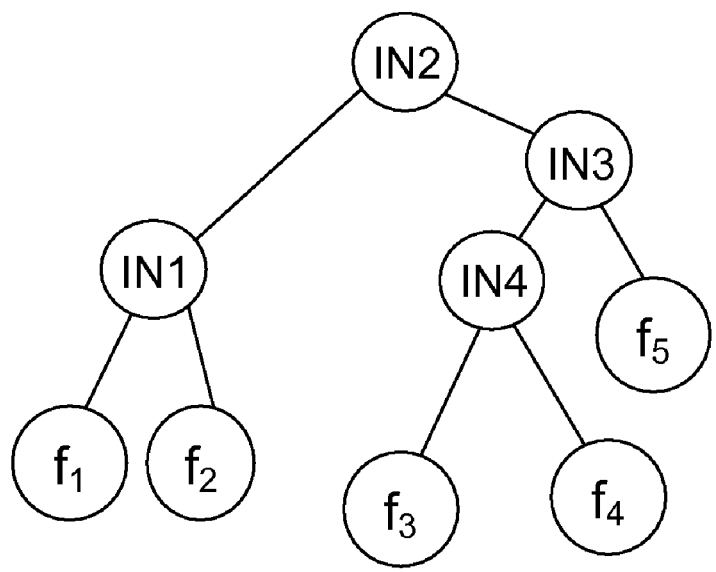
FIG. 3A illustrates a dendrogram generated by a clock gating tool in accordance with the present teachings.

Returning to step 200, if there exists two or more small gating groups in the circuit, the method of FIG. 2 proceeds with step 210 to build clusters of the gating functions by employing hierarchical (agglomerative) clustering using a similarity measure which describes the distance between two of the gating functions of the respective small gating groups. Given a set of gating conditions $f_1, f_2, \ldots, f_n$, the method performs hierarchical clustering, and the result of the agglomerative clustering is a merge tree called "a dendrogram", as shown for example in FIG. 3A. The method may employ a distance function defined on Boolean functions to generate the clusters. Each internal node in the dendrogram may then be assigned, for example, to represent a gating domain wherein the gating condition is a conjunction of the functions in its leaves. For example in FIG. 3A, internal node $IN_1$ represents a gating domain wherein the gating condition is a conjunction of the functions $f_1$ and $f_2$.

The distance between the two functions, such as function $f$ and function $g$, may be defined, for example, by the equation below:

$$d(f, g) \equiv 1 - \frac{|f \cdot g| + |\forall_s f \cdot g|}{2|f + g|}$$

$f$ denotes a first gating condition;
g denotes a second gating condition;
where · and + are logical And Or operators, respectively, ∥ is the size of the On-set of a function;
$\forall sf \cdot g$ denotes a conjunction of $f$ and g where all the variables s which are not in the support of both $f$ and g are quantified out;
$2|f+g|$ is a normalizing term.

FIGS. 4A and 4B provide examples of performing the distance calculations for function $f$ and function g, defined over variables $u_1$, $u_2$, and $u_3$, according to the definition provided above.

Figure 5A:
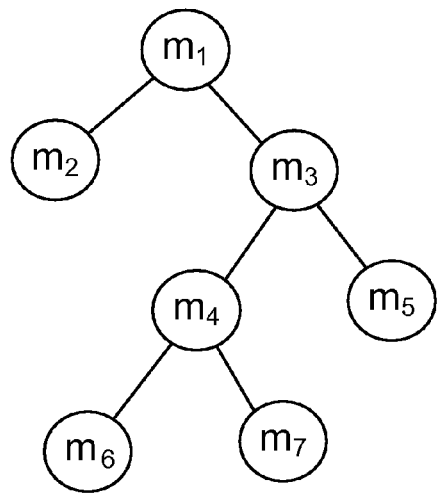
FIG. 5A illustrates a dendrogram generated by a clock gating tool in accordance with the present teachings.

Referring back to FIG. 2, using a merit function (i.e., a cost function), the method in step 220 assigns a merit value (m) (i.e., cost value) for each node in the dendrogram, as shown, for example in FIG. 5A. The merit value of a node m is indicative of the power saving obtained using the gating group defined by node m (i.e. the collection of flip-flops of latches associated with the leaf nodes in m's sub-dendrogram).

The merit of a group g may be defined according to the following equation:

$$M(g) \equiv |g| \cdot Pr(f_g) - C_{LCB}$$

$f_g$ denotes the gating function of group g;
$Pr(f_g)$ denotes the gating probability of $f_g$; and
$C_{LCB}$ denotes an expression reflecting the cost of adding LCBs for gating the group.

In the merit function defined above, $f_g$ is the conjunction of the group elements gating functions. The $Pr(f_g)$ may be calculated accurately using signal probabilities and correlation information obtained from simulations.

Figure 3B:
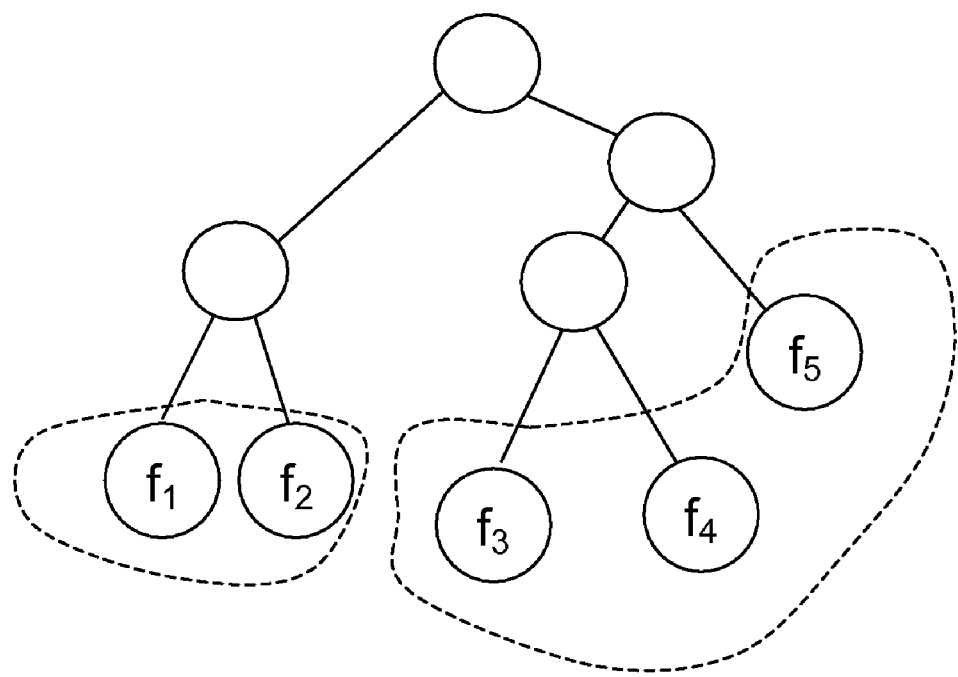
FIG. 3B illustrates a set of gating groups generated by a clock gating tool in accordance with the present teachings.

In step 230, the method selects the gating groups using the dendrogram such that the overall merit (cost saving) is maximized. Using the dendrogram, the method partitions the function space into groups, as shown, for example, in FIG. 3B, such that the overall merit is maximized. An appropriate partitioning region of the merged gating group is determined to select the gating groups by using the dendrogram to find the optimal partition of the gating functions which maximizes the power savings with respect to the merit function defined on the merged gating group.

The constructed clusters can be optimized by minimizing a variety of cost functions. The merit function (i.e., the cost function) typically may include, for example, capacitance minimization, delay minimization, capacitance balancing, fan-out balancing, delay balancing, and any combination thereof.

Figure 5B:
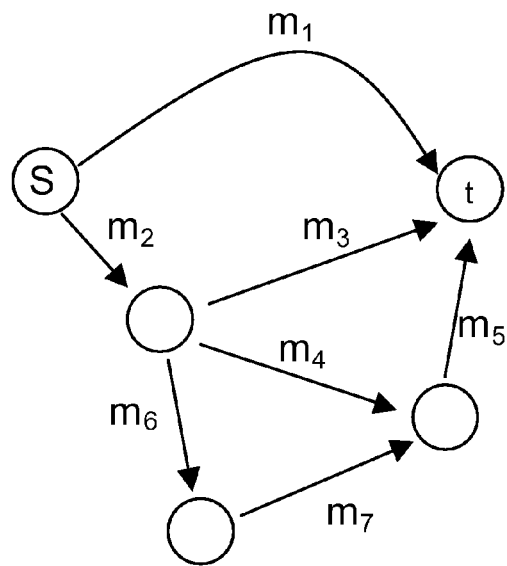
FIG. 5B illustrates a directed acyclic graph (DAG) constructed using the dendrogram in FIG. 5A.

The method in step 230 finds the appropriate partition, which maximizes the overall merit, by using the dendrogram shown, for example, in FIG. 5A to construct a directed acyclic graph (DAG) shown in the example of FIG. 5B. Namely, FIG. 5A illustrates an example of a dendrogram obtained by the construction algorithm provided above and its corresponding DAG (FIG. 5B).

The method may construct the DAG as shown in FIG. 5B from the dendrogram in FIG. 5A using the below algorithm:

Step 1. Create a source vertex (s) and a sink vertex (t). Add an edge (s, t) and assign it the merit of the root node of the dendrogram.

Step 2. Starting from the root node of the dendrogram, perform the following recursively:
  a. If the current node is a leaf node in the dendrogram, stop recursing.
    i. Set u as the source vertex of the edge in the graph representing the current node in the dendrogram, and v as the sink vertex.
  b. Add a new vertex to the graph, denote it as t.
  c. Add an edge (u, t) and assign it the merit of the left child of the current node.
  d. Add an edge (t, v) and assign it the merit of the right child of the current node.
  e. Continue recursively from a. with the current node's children.

Step 3. The edges in the longest path in the DAG from s to t represent the nodes (groups) in the dendrogram which maximizes the overall merit, i.e. the power saving.

Figure 5C:
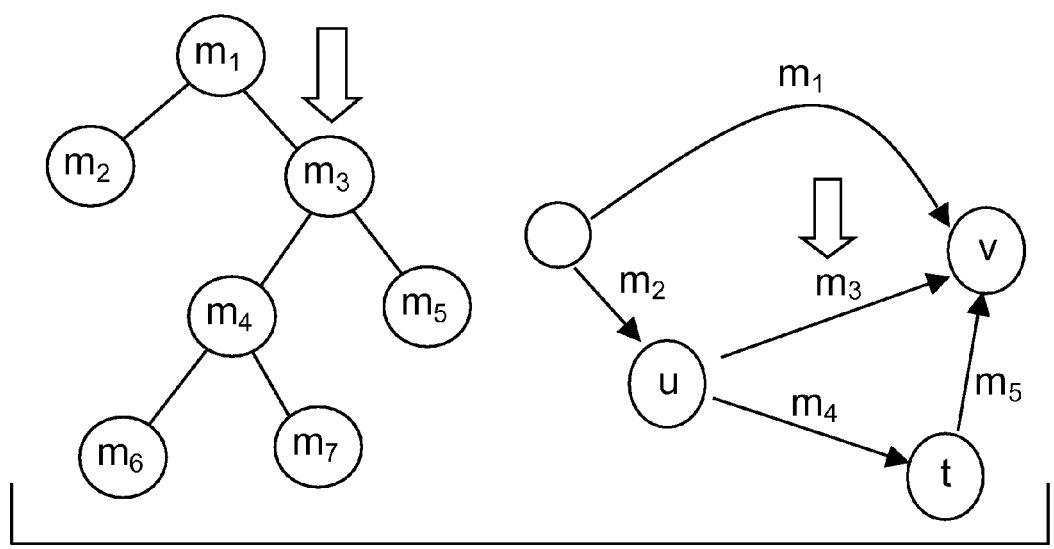
FIG. 5C illustrates an intermediate state of a directed acyclic graph (DAG) during the DAG construction algorithm.

FIG. 5C illustrates an example of one iteration of the DAG construction algorithm The example shows the state of the DAG after performing step 2 of the DAG construction algorithm on the node designated as $m_3$ in the dendrogram.

Once the DAG has been constructed, the method determines the longest path from the source to the sink on the DAG. The method then uses this longest path to determine the partition which maximizes the overall merit, because the overall merit is equivalent to finding the longest path from the source to the sink on the DAG.

A few assumptions worth noting are made in FIGS. 5A and 5B. First, it is assumed in the example of operation shown in FIG. 5 that given a dendrogram for each path from leaf to root only one node can be selected (i.e., a group). This assumption is made to prevent a latch or flip-flip within the circuit which belongs to more than one group from being selected. Furthermore, another assumption that may be made is that each internal node in the dendrogram includes exactly two successor nodes.

Referring back to FIG. 2, in step 240, a determination is then made whether the size of any of the newly partitioned groups exceeds a predetermined upper bound. For instance, the clustering process may be required to satisfy one or more constraints, for example, such as capacitance limits, fan-out limits, skew limits, slew limits, delay limits, and the like.

In this example, the predetermined upper bound may be established based upon the LCB. For instance, the LCBs may have a predefined fan-out size limit as an upper bound constraint, such that the method performs a further partitioning/clustering on any group that requires more than one LCB. Thus, if the size of any remaining groups exceeds a predetermined threshold K, the method returns to step 210 and performs a further partitioning on that particular sub-group.

Figure 6:
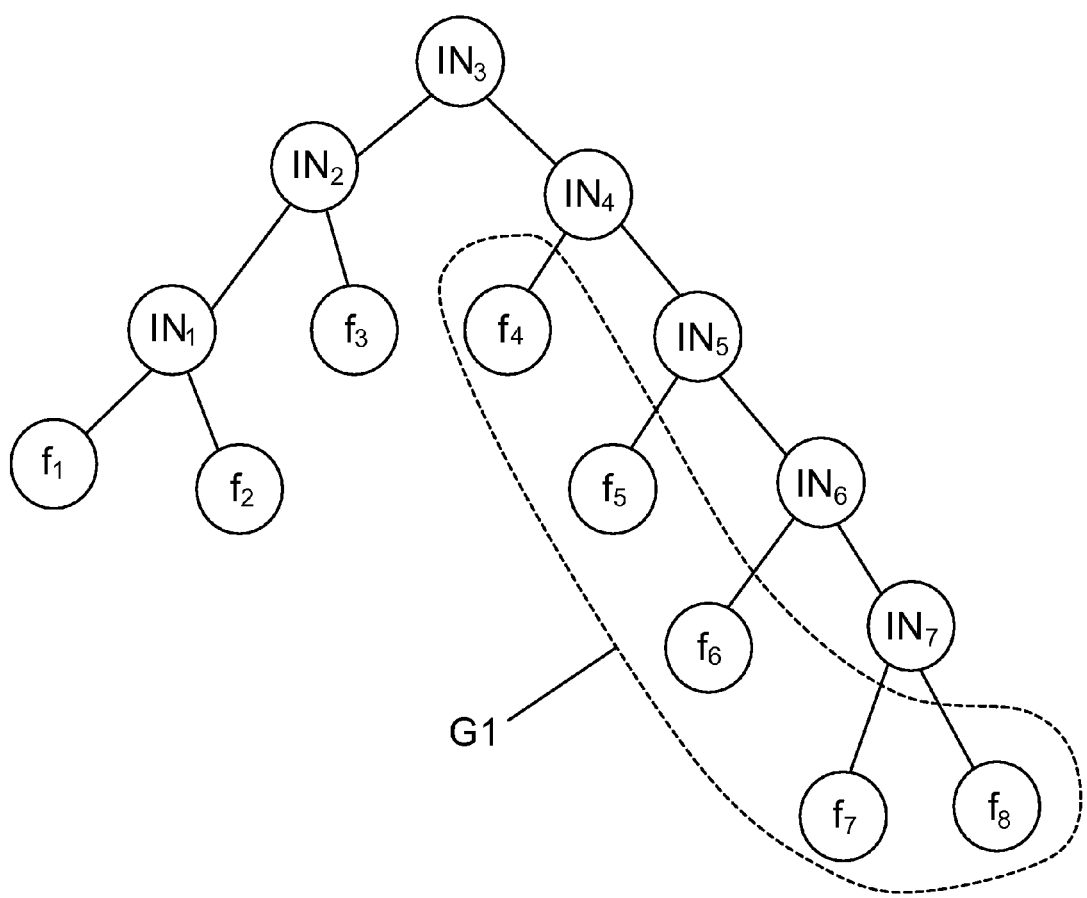
FIG. 6 illustrates further partitioning a gating group of a cluster which exceeds a predetermined threshold established by a clock gating tool in accordance with the present teaching.

The further partitioning/clustering process can be demonstrated by way of example with reference to FIG. 6. In the example of FIG. 6, the threshold limit K=2, the internal nodes are $IN_1$, $IN_2$, $IN_3$, $IN_4$, $IN_5$, $IN_6$, and $IN_7$, and the leaves are $f_1$, $f_2$, $f_3$, $f_4$, $f_5$, $f_6$, $f_7$, and $f_8$. FIG. 6 illustrates a dendrogram which has been partitioned such that newly formed group G1, contains leaves $f_4$, $f_5$, $f_6$, $f_7$, and $f_8$, exceeding the threshold limit of K=2.

The further partitioning/clustering process can be performed for each group whose size exceeds the predetermined threshold K by, first, selecting the lowest K nodes in the dendrogram sub-tree representing that particular group in order to obtain a tighter gating function approximation for the newly selected group. The method selects and assigns the lowest internal node of the group which has at most K leaves as the new gating domain. In FIG. 6, the method selects internal node $IN_7$, as the new gating domain because K=2 and the lowest most K leaves are $f_7$, and $f_8$. By repeating this process for each level of the dendrogram, beginning at the leaves and proceeding backward to the root, a tighter gating function approximation for the newly partitioned groups can be obtained, which further maximizes the power saving.

Second, in the further partitioning/clustering process, after establishing the new gating domain for the lowest most K leaves, the method builds a new dendrogram on the remaining nodes of that sub-tree and repeats the process of creating K-sized groups. Namely, the method returns to step 210 and continues the clustering process with the remaining nodes $f_4$, $f_5$, and $f_6$.

In step 240, if the size of the newly partitioned group is less than the predetermined upper bound, then the newly partitioned group is assigned as the new gating domain in step 250.

Although the flow diagram depicted in FIG. 2 indicates a particular order of operation and a specific granularity of process operations, in alternative embodiments the illustrated order may be varied (e.g., process operations may be performed in another order or performed substantially in parallel with one another) and one or more of the process operations may be coalesced or fragmented. Similarly, additional process operations may be added or eliminated where necessary in alternative embodiments.

For instance, both the distance and the merit functions provided above are exemplary. Therefore, both the distance and the merit functions can be altered or replaced by other definitions. For example, the term $C_{LCB}$ in the merit function can instead be defined as the minimal required number of the LCBs for the group (based on the group size and the fan-out limit of an LCB) times the cost of each LCB (relative to a latch). Another example of an alternate definition is to embed real simulation data in the merit function, i.e. signal activity factors and correlations to make system and method of the clock gating tool more accurate.

While the preferred embodiment to the invention has been described, it will be understood that those skilled in the art, both now and in the future, may make various improvements and enhancements which fall within the scope of the claims and without departing from the scope and the teachings of the present disclosure. Thus, the claims should be construed to maintain the proper protection for the present disclosure.

What is claimed is:

1. A system for clustering Boolean functions for clock gating, the system comprising:
   a computer configured to:
   identify at least two small gating groups within a clock tree representative of an electrical network and at least two gating functions of the at least two small gating groups, wherein the at least two gating functions are Boolean functions;
   perform hierarchical clustering on the at least two gating functions using a similarity measure that describes a distance between the at least two gating functions such that the clustering forms a merge function of a cluster generated and displayed in a form of a dendrogram including a plurality of nodes, wherein each internal node of the plurality of nodes represents a respective gating domain, wherein the hierarchical clustering uses a distance function according to an equation:

$$d(f, g) \equiv 1 - \frac{|f \cdot g| + |\forall_s f \cdot g|}{2|f + g|},$$

$f$ denotes a first gating condition;
   g denotes a second gating condition;
   where · and + are logical And Or operators, respectively, || is a size of an On-set of a function;
   $\forall sf \cdot g$ denotes a conjunction of $f$ and g where all variables s which are not in a support of both $f$ and g are quantified out;
   $2|f+g|$ is a normalizing term;
   assign to each gating domain a merit value according to a power consumption profile of the gating domain using a merit function according to an equation:

$M(g) \equiv |g| \cdot Pr(f_g) - C_{LCB}$, where $f_g$ denotes a gating function of group g;
   $Pr(f_g)$ denotes a gating probability of $f_g$; and
   $C_{LCB}$ denotes an expression reflecting a cost of adding LCBs for gating the group;
   partition the cluster into gating groups using the dendrogram to construct a directed acyclic graph and determine a longest path from a source to a sink on the directed acyclic graph in order to determine a partition which maximizes an overall power saving; and
   if any gating group size exceeds a predetermined local clock buffer threshold, further partition the gating group that exceeds the predetermined local buffer threshold by selecting and assigning a lowest internal node of the selected gating group which has leaves equivalent to the predetermined local clock buffer threshold as a new gating domain, and iteratively repeat on any remaining nodes of the selected gating group said hierarchical clustering to generate said dendrogram, assign, and partition.

* * * * *